Sept. 3, 1935. R. UTIGER 2,013,223
FENCE TOOL
Filed Aug. 10, 1933

INVENTOR
Ralph Utiger
BY Wheeler, Wheeler & Wheeler
ATTORNEYS

Patented Sept. 3, 1935

2,013,223

UNITED STATES PATENT OFFICE 2,013,223

FENCE TOOL

Ralph Utiger, Delavan, Wis.

Application August 10, 1933, Serial No. 684,551

9 Claims. (Cl. 254—66)

My invention relates to an improvement in fence tools.

The object of my invention is to provide a tool or instrument for installing or repairing wire fencing of any kind, for handling wire wherever stretching, splicing or repairing of the fence is required.

More specifically stated, it is the object of my invention to provide a tool for the task of stretching wire, a tool which may be attached to the wire wherever found merely by hooking my improved tool onto one length of the wire, placing the other length of wire in another open hook of my tool, and thereafter by simple movement of levers to bring the wire up to proper position merely by continued oscillation of one of the handles, the moving parts of my tool being automatic in their operation in other respects, as will be obvious in the description hereinafter set forth.

In the drawing.

Like parts are identified by the same reference characters throughout the several views.

Figure 2:
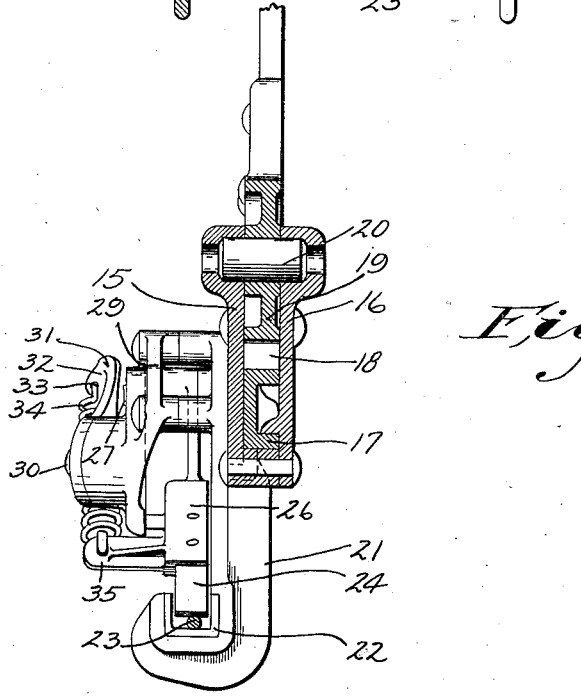
Fig. 2 is a verticle section on line 2—2 of Fig. 1.

My tool includes a main frame 10 provided with a fixed handle 11 and an oscillatable handle 12. Portions of the main frame 10 are extended in a direction opposite to that of the handles to provide two fixed hook-shaped jaws 13 and 14 at the extremities of the frame. Centrally of the frame I provide a track housed by portions 15 of the frame and a cover plate 16 within which a movable rack bar 17 may reciprocate. The teeth 18 of the rack bar are extended upwardly to mesh with a gear sector 19 forming part of the mounting 20 for the handle 12, said mounting 20 comprising a pin extending into the portion 15 of the frame and into the cover plate 16 as indicated clearly in Fig. 2.

Depending from the rack bar 17 I provide a movable jaw 21 hook-shaped in a manner substantially identical with that of the jaws 13 and 14 and substantially aligned therewith.

Figure 1:
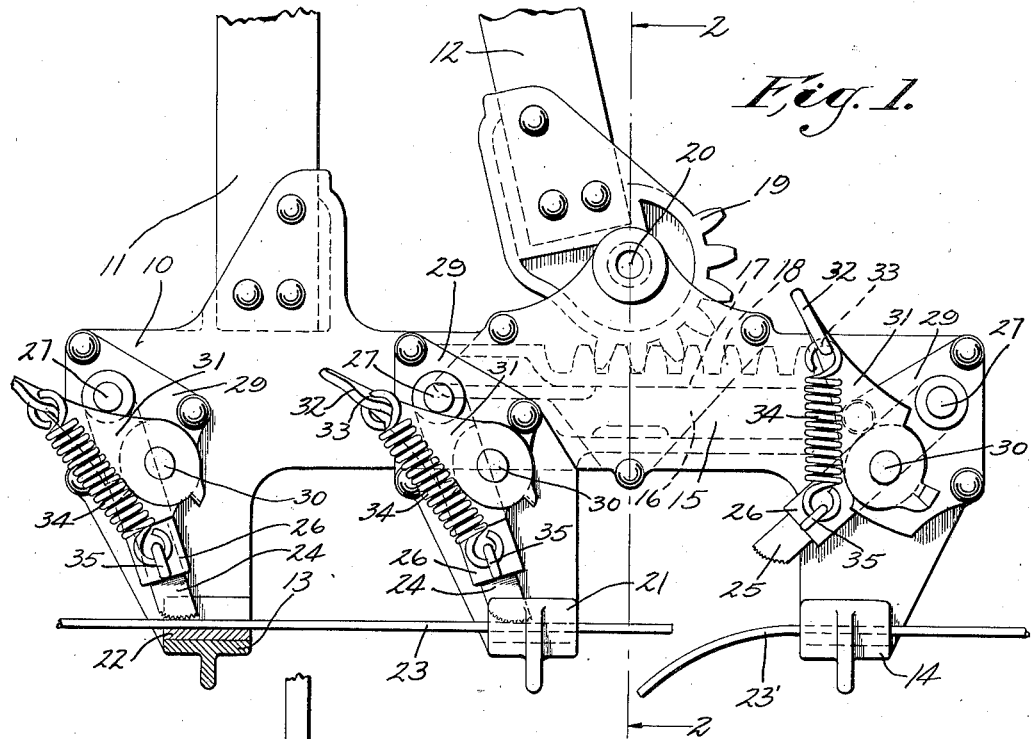
Fig. 1 is a side elevation of my tool showing the respective jaws and the method of operating the handle to affect the purposes of my invention.

Each of the jaws 13, 14 and 21 is provided with a wire seat 22 against which a wire 23 is grippingly engaged by a dog 24 or 25 as indicated in Fig. 1. Each of these dogs 24 and 25 is mounted for snap action from a position such as that indicated by dog 24 which is in engagement with wire 23 in the jaw or to the position indicated by the dog 25 which is retracted from jaw 14. The mounting of the dogs 24 and 25 comprises square tubes 26 mounted for pivotal motion upon pins 27, each of said pins 27 being off-set from the wire seats of the respective jaws with which they are intended to co-operate, as will be clear from the description hereinafter set forth.

Mounted upon pivot pins 30 are levers 31 each provided with a thumb plate 32 apertured at 33 to receive the hook of a spring 34 extending between the thumb piece and a lug 35 forming a part of the square tube 26. It will thus be seen that the pivoted wire engaging dogs are mounted so as to have two normal positions. As shown at the left of Figure 1, the dogs are in wire engaging position, and the springs 34 extending between the dogs and the levers 31 are disposed to one side of the pivoting axis of the dogs, to urge them into wire engaging position. As shown at the right of Figure 1, the dog 25 is in the other, retracted position, remote from the guide 14 and wire 23'. The spring 34 disposed between this dog and the corresponding lever 31 is positioned so as to urge the dog 25 away from the guide 14. By swinging the levers 31, the springs 34 may be moved from one side of the pivoting axis 27 to the other. As the springs are moved past this center line, a tension will be placed upon the dogs to swing them from one position to the other. This action is very definite and positive, and the dogs are always under spring tension urging them to one position or another. When the dogs are retracted and are positioned remote from the wire guides 13, 14 or 21, the parts are in position to facilitate placing a wire in the guides or removing the same therefrom.

To facilitate the mounting of the pins 30 and 27 and to substantially support the square tubes 26 and dogs 24 and 25, I provide a separate housing 29 for each of the dog lever assemblies, thus providing support for the extended ends of the pivot pins 27 and 30.

From the above description it will be seen that when the dogs 24 and 25 are in retracted position my tool may be hooked upon wires wherever found and however supported since the jaws are wide open to receive the wires. The wires being in position upon the wire seats 22, the thumb pieces 32 may be flipped from the position shown at the right of Fig. 1. Oscillation of handle 12 while handle 11 and frame 10 are held in a steady position will result in the movement of wire 23 toward the right as seen in Fig.

1 while wire 23' shown at the right of Fig. 1 will be held steady by dog 25. When the wires have been stretched to their proper tension the ends of wires 23 and 23' may be twisted together or otherwise secured to complete the wire stretching and repairing operation.

It will be noted that because of the movability of the central jaw member in my tool the jaws at the ends of the frame 10 perform all of the functions heretofore supplied by extensive and cumbersome means for attaching wire stretching tools to posts or other stationary devices, and it will also be noted that by reason of the ready application of the open jaws of my tool upon any selected wire in a woven wire fence, it is possible to accomplish a repair operation without a series of slow and complicated manipulations required in the use of other tools.

I claim:

1. The combination with a body and slide assembly, of a pair of handles projecting laterally from the same side of said assembly and movable with respect to each other, means for transmitting relative movement of said handles to said slide to actuate the slide with respect to the body, a plurality of arms projecting from the side of said assembly opposite to said handles, two of said arms being rigidly connected with the body and spaced longitudinally thereof, and the third arm being disposed between the body arms and connected with the slide, wire guides at the ends of the respective arms and adapted to pass cross wires connected with a wire engaged in the guides, movable dogs mounted on said arms to engage a wire positioned by said guides, a spring associated with each dog, and movable means associated with the springs serving, in one position, to render the springs effective to urge the dogs to wire engaging position, and, in another position, to render the springs effective to urge the dogs to release position, the dog on the slide arm and the dog on one of the body arms being engageable with the wire in the same direction and the dog on the other body arm being engageable in the opposite direction, whereby the manipulation of said handles will draw up wire engaged by the dog between the longitudinally spaced arms.

2. The combination with a body and slide assembly, of a pair of handles projecting laterally from the same side of said assembly and movable with respect to each other, means for transmitting relative movement of said handles to said slide to actuate the slide with respect to the body, a plurality of arms projecting from the side of said assembly opposite to said handles, two of said arms being rigidly connected with the body and spaced longitudinally thereof, and the third arm being disposed between the body arms and connected with the slide, wire guides at the ends of the respective arms shaped in the form of open hooks whereby to pass cross wires connected with a wire engaged in said guides, and a dog mounted for pivotal movement with respect to each of said arms whereby said dog may move from a position wholly out of the hook of the guide to a position of engagement with a wire in the guide, and a snap lever provided with a spring connected to the dog whereby to snap the dog to and from its position of engagement with a wire in said hook.

3. The combination with a body and slide assembly, of a pair of handles projecting laterally from the same side of said assembly and movable with respect to each other, means for transmitting relative movement of said handles to said slide to actuate the slide with respect to the body, a plurality of arms projecting from the side of said assembly opposite to said handles, two of said arms being rigidly connected with the body and spaced longitudinally thereof, and the third arm being disposed between the body arms and connected with the slide, wire guides at the ends of the respective arms shaped in the form of open hooks whereby to pass cross wires connected with a wire engaged in said guides, and a dog mounted for pivotal movement with respect to each of said arms whereby said dog may move from a position wholly out of the hook of the guide to a position of engagement with a wire in the guide, and a snap lever provided with a spring connected to the dog whereby to snap the dog to and from its position of engagement with a wire in said hook, said spring being so weak as to be incapable of releasing a dog from a wire in said hook when said wire is under tension induced by the relative action of the arm connected to said slide.

4. A wire stretcher comprising a body having a pair of spaced wire guides, a slide movable with respect to the body and having a wire guide movable between the first mentioned guides, a pivoted wire engaging dog associated with each guide, a spring connected at one end to each dog and adapted, in one position, to urge its dog toward the guide to cooperate with the same to engage a wire positioned therein, each of said springs being movable at its opposite end to move each spring to another position to urge its dog away from the guide to facilitate the operation of placing a wire in the guide or removing the same therefrom.

5. A wire stretcher comprising a body having a wire guide, a slide movable with respect to the body and having a wire guide movable toward and away from the first mentioned guide, a dog associated with each guide mounted for pivotal movement between a wire engaging position adjacent the guide and a position remote therefrom, a spring connected to each dog remote from the pivoting axis thereof, and a manually movable lever connected to each spring to change the position thereof to urge the associated dog positively to one or another of said positions, according to the position of the lever.

6. A wire stretcher comprising a body having a pair of spaced wire guides, a slide movable with respect to the body and having a guide movable between the first mentioned guides, a pivoted wire engaging dog associated with each guide adapted to clamp a wire between its wire engaging end and the associated guide, whereby movement of the movable guide and dog will place wires positioned therein under tension, and spring means associated with each dog, each of said means being connected respectively with its dog and with a movable element, each of said spring means, in one position of said element serving to urge the dogs to said clamping position and in another position of said element to urge the dogs to release position, said spring means, when in the latter position, being ineffective to move the dogs from clamping position when the dogs are engaging a wire under tension.

7. A wire stretcher comprising a body and a slide mounted for movement with respect thereto, and spring actuated wire clamps, one associated with said body and another with said slide, each clamp comprising a wire guide, a pivoted dog, and a spring adapted to pivot the dog toward clamping position adjacent the guide and toward release position remote therefrom, respectively, said spring being connected at one of its ends to said dog at one side of the pivot thereof to urge the dog in one direction, the other end of said spring being associated with a movably mounted element to permit said spring to be moved to the other side of said pivot to urge the dog in the other direction.

8. A wire stretcher comprising a relatively stationary body having a wire guide, a slide movable with respect to the body and having a wire guide movable toward and away from said first mentioned guide, a pivoted wire engaging dog associated with each guide and movable to an operative wire engaging position adjacent its associated guide and to an inoperative position remote therefrom, and spring means having one end attached to a dog and the other end swingable manually independently of the position of said dog whereby to urge said dog to said two positions alternatively.

9. A wire stretcher comprising a body having a pair of spaced wire guides, a slide movable with respect to the body and having a wire guide movable between the first mentioned guides, a pivoted wire engaging dog associated with each guide, and a spring positioned on one side of the pivotal axis of each dog, each of said springs having one end attached to its respective dog and having its other end provided with a member attached and movable with respect to its associated guide whereby the end of the spring attached to said movable member may be swung to the other side of said pivotal axis to urge the dog away from the guide to permit insertion of a wire into the guide or removal of the same therefrom.

RALPH UTIGER.